(12) United States Patent
Tao et al.

(10) Patent No.: US 11,929,083 B2
(45) Date of Patent: Mar. 12, 2024

(54) SIGNAL PROCESSING DEVICE, SOUND-REPRODUCTION SYSTEM, AND SOUND REPRODUCTION METHOD FOR ENHANCING ATTRACTIVENESS OR RECOGNITION OF A SOUND, SUCH AS AN ENGINE SOUND

(71) Applicant: PANASONIC INTELLECTUAL PROPERTY MANAGEMENT CO., LTD., Osaka (JP)

(72) Inventors: Masafumi Tao, Kanagawa (JP); Kanro Oyama, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 317 days.

(21) Appl. No.: 17/480,523

(22) Filed: Sep. 21, 2021

(65) Prior Publication Data

US 2022/0005485 A1     Jan. 6, 2022

Related U.S. Application Data

(63) Continuation of application No. PCT/JP2020/005420, filed on Feb. 12, 2020.

(30) Foreign Application Priority Data

Mar. 27, 2019 (JP) ................................ 2019-059938

(51) Int. Cl.
*G10K 15/02* (2006.01)
*G06F 3/16* (2006.01)
*G10L 19/008* (2013.01)

(52) U.S. Cl.
CPC ............ *G10L 19/008* (2013.01); *G06F 3/165* (2013.01); *G10K 15/02* (2013.01)

(58) Field of Classification Search
None
See application file for complete search history.

(56) References Cited

U.S. PATENT DOCUMENTS 6,307,941 B1 * 10/2001 Tanner, Jr. .............. H04S 1/002
381/1
2008/0260166 A1   10/2008 Hess
(Continued)

FOREIGN PATENT DOCUMENTS

CN     101149925     3/2008
CN     101682814     3/2010
(Continued)

OTHER PUBLICATIONS

Written Opinion of the International Searching Authority issued in International Pat. Appl. No. PCT/JP2020/005420, dated Apr. 28, 2020.
(Continued)

*Primary Examiner* — James K Mooney
(74) *Attorney, Agent, or Firm* — Greenblum & Bernstein, P.L.C.

(57) ABSTRACT

A signal processing device includes: a processor; and a memory having instructions. The instructions, when executed by the processor, cause the signal processing device to perform operations. The operations include performing a modulation processing of modulating a sound
(Continued)

signal by using a modulation parameter based on an interaural phase difference at a listening position of the sound signal.

17 Claims, 8 Drawing Sheets

(56) References Cited

U.S. PATENT DOCUMENTS

| | | |
|---|---|---|
| 2008/0273713 A1 | 11/2008 | Hartung et al. |
| 2008/0273714 A1 | 11/2008 | Hartung |
| 2008/0273722 A1 | 11/2008 | Aylward et al. |
| 2008/0273723 A1 | 11/2008 | Hartung et al. |
| 2008/0273724 A1 | 11/2008 | Hartung et al. |
| 2008/0273725 A1 | 11/2008 | Hartung et al. |
| 2009/0304198 A1 | 12/2009 | Herre et al. |
| 2011/0103590 A1 | 5/2011 | Christoph et al. |
| 2011/0211702 A1 | 9/2011 | Mundt et al. |
| 2012/0314873 A1 | 12/2012 | Hess |
| 2013/0279716 A1 | 10/2013 | Hartung et al. |
| 2014/0056438 A1* | 2/2014 | Baalu ............... B60Q 5/008 381/86 |
| 2015/0373476 A1 | 12/2015 | Christoph et al. |
| 2017/0064452 A1 | 3/2017 | Hartung |

FOREIGN PATENT DOCUMENTS

| | | |
|---|---|---|
| CN | 103561378 | 2/2014 |
| CN | 103731796 | 4/2014 |
| CN | 107682781 | 2/2018 |
| JP | 09-065483 | 3/1997 |
| JP | 2009-533912 | 9/2009 |
| JP | 2011-097561 | 5/2011 |
| JP | 5827478 | 12/2015 |

OTHER PUBLICATIONS

International Search Report issued in International Pat. Appl. No. PCT/JP2020/005420, dated Apr. 28, 2020, along with an English translation thereof.
Office Action issued by the China National Intellectual Property Administration (CNIPA) in Chinese Patent Application No. 202080023735.X, dated Aug. 22, 2023, together with an English language translation.

* cited by examiner

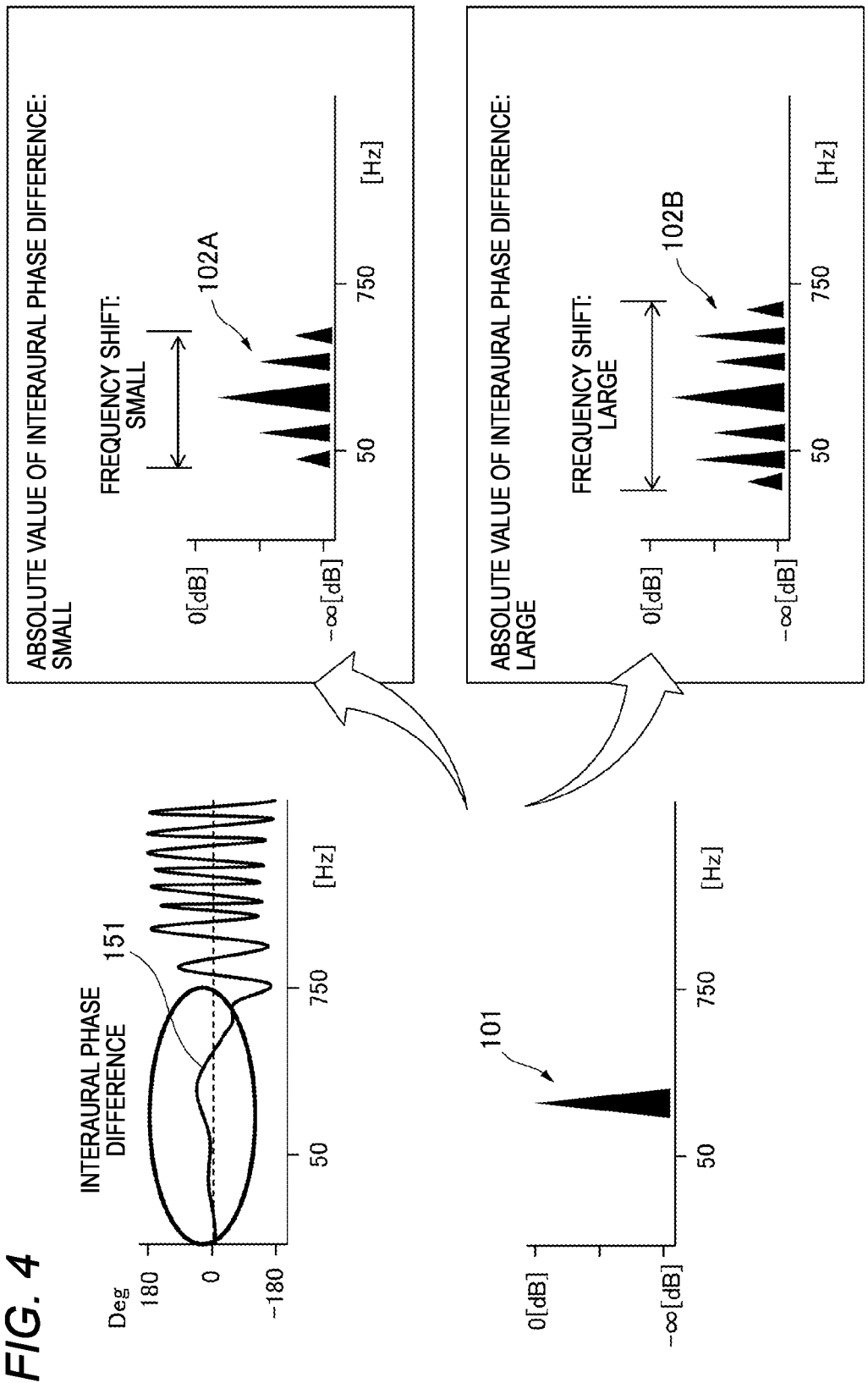

SIGNAL PROCESSING DEVICE, SOUND-REPRODUCTION SYSTEM, AND SOUND REPRODUCTION METHOD FOR ENHANCING ATTRACTIVENESS OR RECOGNITION OF A SOUND, SUCH AS AN ENGINE SOUND

CROSS-REFERENCE TO RELATED APPLICATIONS

This application is a continuation of PCT International Patent Application No. PCT/JP2020/005420 filed on Feb. 12, 2020, which claims the benefit of priority of Japanese Patent Application No. 2019-059938 filed on Mar. 27, 2019, the entire contents of which are incorporated herein by reference.

FIELD

The present disclosure relates to a signal processing device, a sound-reproduction system, and a sound reproduction method that perform a signal processing on a sound signal.

BACKGROUND

In a vehicle, an engine sound enhancement device that generates an engine sound in a pseudo manner may be employed. A purpose is, for example, to enhance attractiveness of an engine sound, or to allow a pedestrian to recognize approach of a vehicle by an engine sound in an electric vehicle (EV), a hybrid vehicle (HV), or the like. A pseudo engine sound is also useful for making a driving experience enjoyable by making a driver and a fellow passenger enjoy a sense of speed and a sense of traveling, and improving a sense of realism of traveling by the engine sound.

For example, Japanese Patent No. 5827478 discloses an in-vehicle audio device that outputs a sound from speakers arranged on left and right sides of a vehicle interior. The in-vehicle audio device first generates monaural signals based on predetermined low-frequency bands of sound signals corresponding to the speakers. Next, phases of the monaural signals are individually changed by using a digital filter such that phases of combined waves based on outputs of the speakers are in phase between both ears of a listener corresponding to a seating position. Then, predetermined high-frequency bands are combined with the sound signals for the monaural signals whose phases have been changed. Accordingly, it is possible to satisfactorily localize a sound image for a plurality of listeners.

SUMMARY

It is necessary to further improve sound image localization of an output signal.

An object of the present disclosure is to provide a signal processing device, a sound-reproduction system, and a sound reproduction method that can further improve sound image localization of an output signal.

According to an aspect of the present disclosure, there is provided a signal processing device including: a processor; and a memory having instructions that, when executed by the processor, cause the signal processing device to perform operations including: performing a modulation processing of modulating a sound signal by using a modulation parameter based on an interaural phase difference at a listening position of the sound signal.

According to another aspect of the present disclosure, there is provided a sound-reproduction system configured to reproduce a sound signal, the sound-reproduction system including: a sound generator; a signal processor; and an output device, wherein the signal processor includes a processor and a memory having instructions that, when executed by the processor, cause the signal processor to perform operations including: performing a modulation processing of modulating a sound signal from the sound generator by using a modulation parameter based on an interaural phase difference at a listening position of a sound signal output from the output device; and outputting, to the output device, the sound signal that has been subjected to the modulation processing.

According to another aspect of the present disclosure, there is provided a sound reproduction method for reproducing a sound signal, the sound reproduction method including: performing a signal processing including a modulation processing of modulating the sound signal by using a modulation parameter based on an interaural phase difference at a listening position of the sound signal; and outputting the sound signal that has been subjected to a signal processing through an output device.

According to the present disclosure, it is possible to further improve sound image localization of an output signal.

BRIEF DESCRIPTION OF DRAWINGS

FIG. 4 is a diagram illustrating a specific example of a modulation processing according to the embodiment.

FIG. 5A is a block diagram of the phase adjuster. FIG. 5B is a characteristic diagram showing frequency characteristics of a phase shifter.

FIG. 8A is a diagram showing magnitude of a change amount in accordance with a rotational speed. FIG. 8B is a diagram showing magnitude of a change amount in accordance with a torque.

Figure 1:
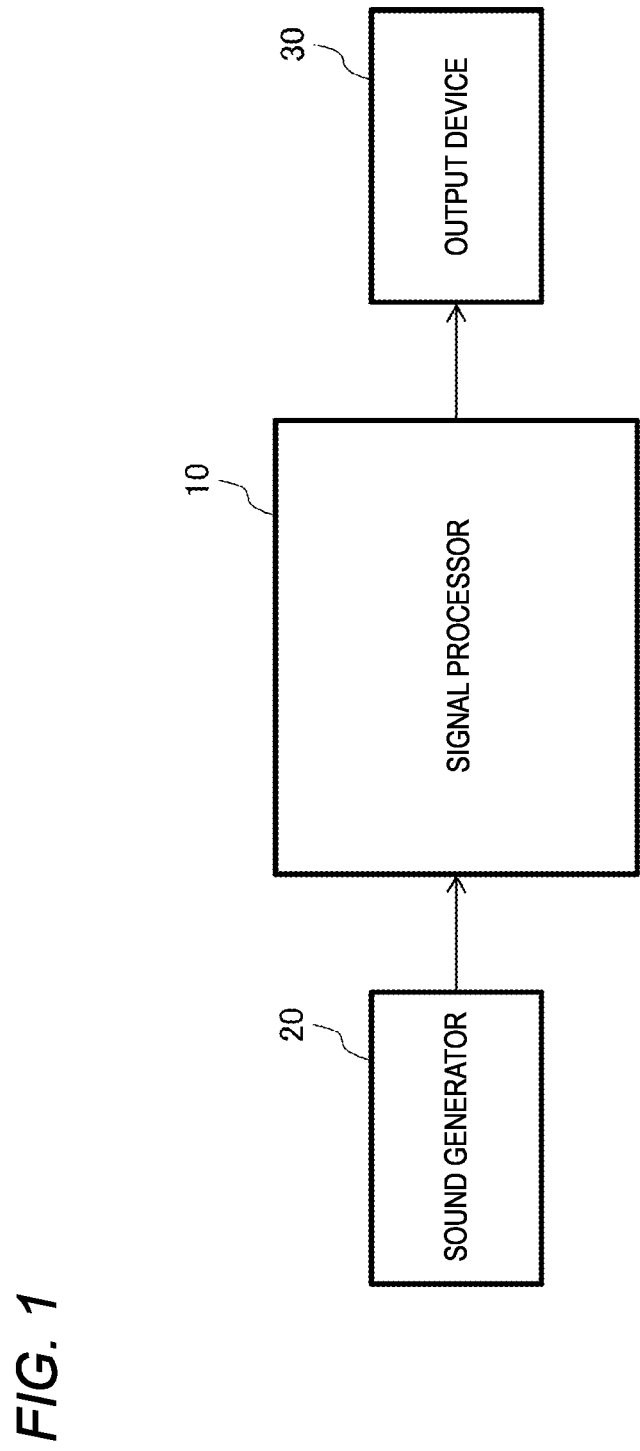
FIG. 1 is a block diagram showing an example of a configuration of a sound-reproduction system according to an embodiment.

DETAILED DESCRIPTION (Findings Leading to Present Disclosure)

When a sound image of a generated pseudo engine sound is stably localized, for example, in the vicinity of a center in front of a vehicle, an occupant of the vehicle perceives the pseudo engine sound like an actual engine sound generated from an engine, and a sense of realism is improved. In order to stably localize a sound image at a predetermined position in a vehicle interior, it is necessary to adjust an output signal in consideration of sound characteristics. Examples of the sound characteristics include an interaural phase difference (IPD) and an interaural level difference (ILD) of the occupant. A sound that reaches both ears from a sound source has different arrival times and volumes between the left and right ears depending on a direction and a distance of the sound source. A human determines a direction of a sound based on a left-right difference. A reproduced sound can be binaural by adding the left-right difference to a sound signal.

For example, in the related art described in Japanese Patent No. 5827478, phases of output signals of a plurality of systems are adjusted such that sound signals output from a plurality of speakers are in phase between both ears by using a parameter of a digital filter calculated based on a phase difference between both ears. When the phases of the sound signals are adjusted, a parameter of a digital filter in which the sound signals are in phase between both ears may not be obtained in some frequency bands. That is, a phase difference may remain in the sound signals that has been subjected to the phase adjustment. When an interaural phase difference of the sound signals cannot be eliminated, there is a problem that it is difficult to stably localize a sound image. The case where the interaural phase difference of the sound signals cannot be eliminated is, for example, a case where sound characteristics in the vehicle interior are not suitable for phase adjustment using a digital filter.

Therefore, the present disclosure shows a configuration example of a signal processing device that can stabilize localization of a sound source even in an environment where an interaural phase difference cannot be eliminated when sound image localization of a pseudo engine sound is performed.

Hereinafter, embodiments specifically disclosing a signal processing device, a sound-reproduction system, and a sound reproduction method according to the present disclosure will be described in detail with reference to the accompanying drawings as appropriate. However, unnecessarily detailed description may be omitted. For example, detailed description of a well-known matter or repeated description of substantially the same configuration may be omitted. This is to avoid unnecessary redundancy in the following description and to facilitate understanding of those skilled in the art. It should be noted that the accompanying drawings and the following description are provided for a thorough understanding of the present disclosure for those skilled in the art, and are not intended to limit the subject matter recited in the claims.

The following embodiments show, as examples of a signal processing device, configuration examples of a signal processing system including a signal processor that adjusts sound image localization of a pseudo engine sound and a sound-reproduction system including the signal processor.

(System Configuration of Embodiment)

FIG. 1 is a block diagram showing an example of a configuration of a sound-reproduction system according to an embodiment. The present embodiment shows a configuration example of the sound-reproduction system that performs a signal processing on a sound signal of a pseudo engine sound and outputs a pseudo engine sound whose sound image localization has been adjusted. The sound-reproduction system of the present embodiment can be applied to, for example, a device that is mounted on a vehicle and reproduces and outputs a pseudo engine sound to an occupant in a vehicle interior.

The sound-reproduction system includes a signal processor 10 that performs a signal processing on an input signal, a sound generator 20 that generates a pseudo engine sound, and an output device 30 that outputs a sound signal that has been subjected to the signal processing. The input signal is, for example, a sound signal.

The sound generator 20 includes, for example, an oscillation sound source that generates a pseudo engine sound having a frequency component corresponding to a vehicle situation by a combination of a plurality of oscillators. The sound generator 20 may be configured to store sound source data obtained by sampling an engine sound and output a sampling sound source as a pseudo engine sound in accordance with a vehicle situation.

The output device 30 includes amplifiers of a plurality of systems that amplify a signal that has been subjected to the signal processing by the signal processor 10, and a plurality of speakers as an example of a signal output device.

The signal processor 10 includes a processor and a memory, has a function of a signal processing circuit such as a digital filter that performs a signal processing of a sound signal, and executes a signal processing of an input signal. The input signal is, for example, a pseudo engine sound. The signal processor 10 generates a modulation signal in which a frequency shift is adjusted for the input signal. The signal processor 10 implements various functions by, for example, the processor executing a predetermined program stored in a memory or storage. The processor may include a digital signal processor (DSP), a graphical processing unit (GPU), a micro processing unit (MPU), a central processing unit (CPU), and the like. The memory may include a random access memory (RAM), a read only memory (ROM), and the like. The storage may include a solid state drive (SSD), a hard disk drive (HDD), an optical disk device, a memory card, and the like. Further, the signal processor 10 may be configured with a microcomputer or a hardware circuit that performs a signal processing according to the present disclosure.

A sound signal of a pseudo engine sound generated by the sound generator 20 is modulated by the signal processor 10 and reproduced and output from the speakers of the output device 30. A pseudo engine sound localized in a predetermined direction is recognized by an occupant including a driver in the vehicle interior. Hereinafter, the sound signal of the pseudo engine sound may be referred to as a pseudo engine sound signal. The sound-reproduction system may constitute a pseudo engine sound generation device including the sound generator 20 and the signal processor 10.

Hereinafter, some examples of a specific configuration and an operation of the signal processing device including the signal processor 10 according to the present embodiment will be described.

First Embodiment

Figure 2:
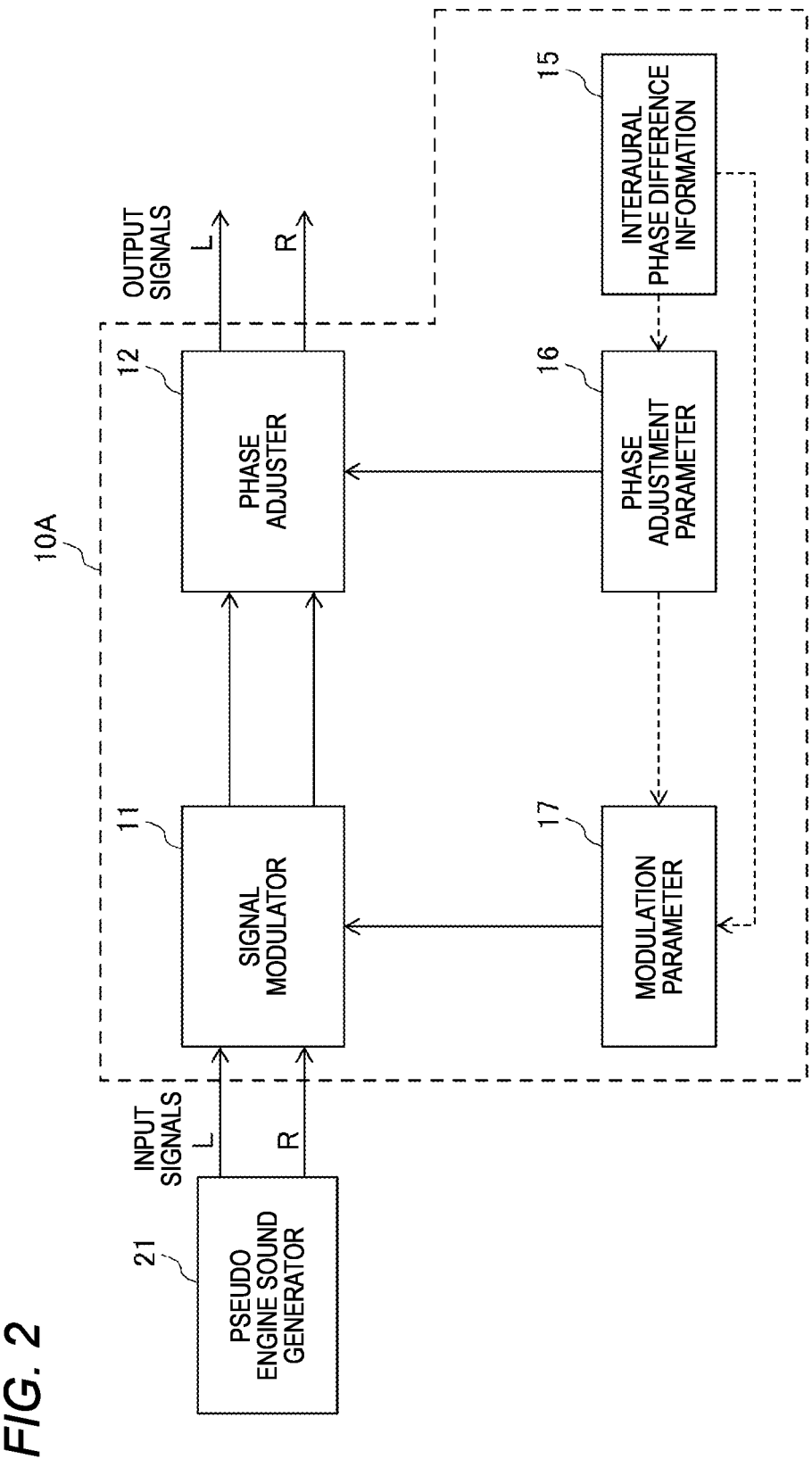
FIG. 2 is a block diagram showing an example of a configuration of a signal processing device according to a first embodiment.

FIG. 2 is a block diagram showing an example of a configuration of the signal processing device according to the first embodiment. The first embodiment is the configuration example of the signal processing device that modulates a pseudo engine sound based on interaural phase difference information. The signal processing device includes a pseudo engine sound generator 21 and a signal processor 10A. In the following description, a case where the pseudo engine sound generator 21 has a configuration including a combination of a plurality of oscillators and outputs signals of two left and right systems (an L channel and an R channel) for performing binaural localization control as sound signals of the pseudo engine sound will be exemplified. Hereinafter, L and R in the drawing indicate that the signals of the two left and right systems are output.

The pseudo engine sound generator 21 generates a pseudo engine sound in accordance with vehicle information and outputs the pseudo engine sound. The vehicle information is various pieces of information on generation of the pseudo engine sound. The vehicle information includes, for example, information on an engine rotational speed, a vehicle speed, a torque, or an accelerator position.

Figure 3:
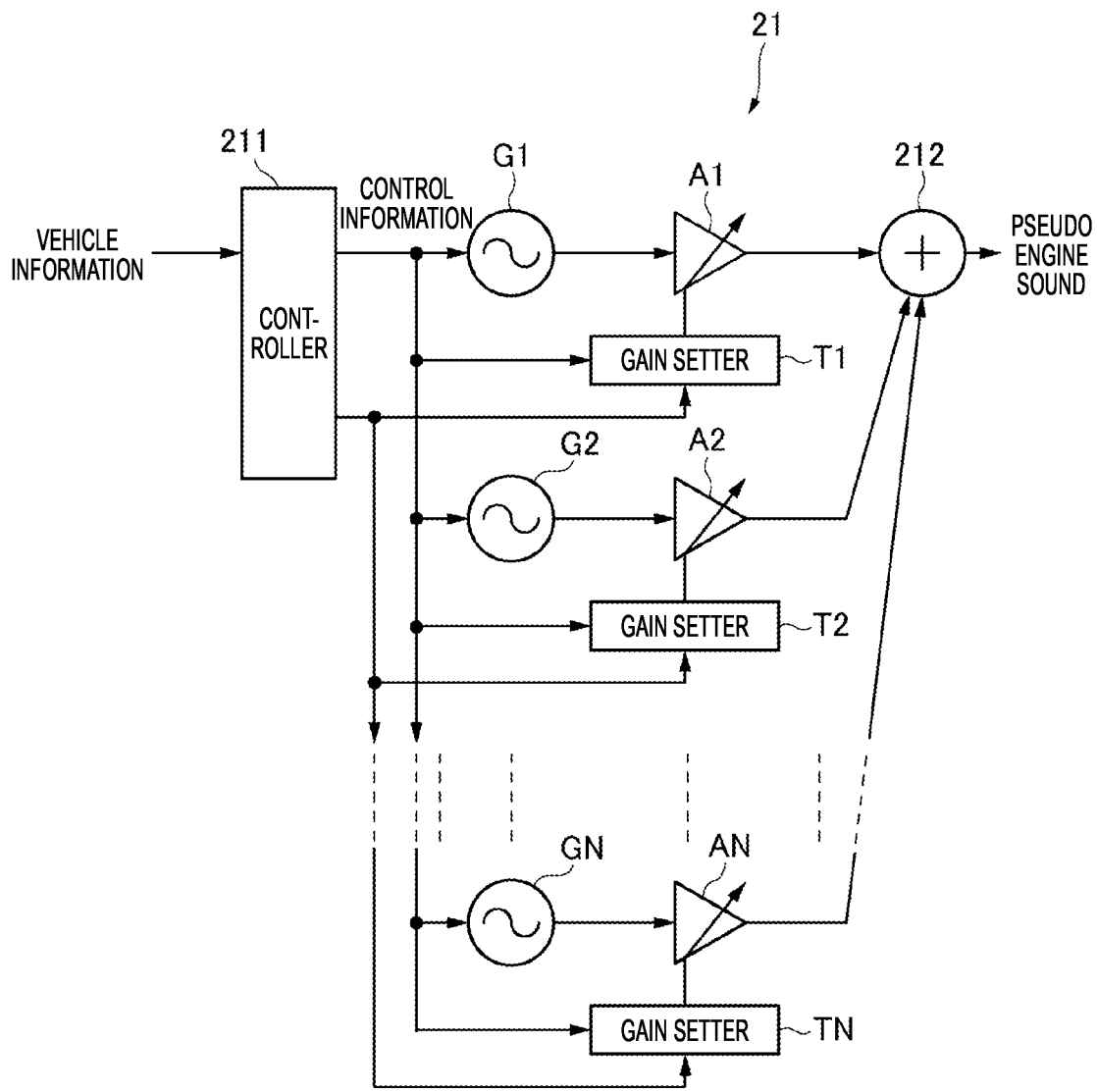
FIG. 3 is a block diagram showing an example of a configuration of a pseudo engine sound generator.

FIG. 3 is a block diagram showing an example of a configuration of the pseudo engine sound generator. The pseudo engine sound generator 21 can be configured to include a known engine sound enhancement device that generates a pseudo engine sound. The vehicle information is input to the pseudo engine sound generator 21.

The vehicle information is acquired by various sensors attached to an engine, an accelerator, a shaft that rotates wheels, and the like, an electronic control unit (ECU) that electrically controls the engine of the vehicle, and the like, and is supplied to the pseudo engine sound generator 21.

The pseudo engine sound generator 21 includes a controller 211, a plurality of oscillators G1 to GN, a plurality of amplifiers A1 to AN, a plurality of gain setters T1 to TN, and a combination circuit 212. The controller 211 may be configured with a processor using a CPU or the like, may operate in accordance with a program stored in a memory (not shown) to control components, or may implement a part or all of functions by an electronic circuit of hardware. The controller 211 outputs control information to the components based on the vehicle information, and controls the components so as to generate a pseudo engine sound corresponding to the vehicle information.

The oscillators G1 to GN and the amplifiers A1 to AN operate in accordance with the control information from the controller 211. In other words, oscillation outputs of the oscillators G1 to GN and gains of the amplifiers A1 to AN are adjusted in accordance with the control information from the controller 211. Outputs of the amplifiers A1 to AN are combined by the combination circuit 212, and a signal obtained by superimposing a plurality of sinusoidal signals is generated. An output of the combination circuit 212 is an output of the pseudo engine sound generator 21, and is output as a pseudo engine sound having a plurality of harmonic overtone components. The pseudo engine sound generated in this way is a signal subjected to sound quality control based on the vehicle information.

The pseudo engine sound generator 21 can generate a pseudo engine sound based on an oscillation signal of one frequency or a pseudo engine sound based on a combined signal of a plurality of oscillation signals of a plurality of frequencies. The pseudo engine sound generator 21 can generate a sound signal having frequency characteristics synchronized with the vehicle information by controlling an oscillation frequency and an oscillation level based on the input vehicle information. Accordingly, it is possible to generate a desired pseudo engine sound that gives a sense of speed, a sense of traveling, or the like.

Returning to FIG. 2, the signal processor 10A includes a signal modulator 11 and a phase adjuster 12. The signal modulator 11 executes a modulation processing for localization stabilization on input signals of pseudo engine sound signals. The modulation processing of the signal modulator 11 includes, for example, FM modulation or AM modulation. The signal modulator 11 adjusts a frequency shift of modulation of the input signals by using a modulation parameter 17 calculated based on interaural phase difference information 15. The interaural phase difference information 15 is determined by positions of speakers and a position of the occupant (that is, a listener) in the vehicle interior. In the present embodiment, the frequency shift used as the modulation parameter 17 represents a degree of spread of modulation. In other words, the frequency shift represents a change amount of a modulation signal. It is possible to improve stability of sound image localization during signal reproduction by varying a frequency shift amount of an input signal depending on a frequency band in accordance with the interaural phase difference information 15. For example, when the FM modulation is performed on an input signal, the frequency shift amount can be represented by a modulation width of a modulation signal or magnitude of a modulation period. In other words, the modulation width of the modulation signal represents a frequency width to be changed. In other words, the modulation period represents a period during which the input signal is changed. A modulation amplitude of the modulation signal may be used as a frequency shift. In other words, the modulation amplitude of the modulation signal represents a signal level width to be changed.

For adjustment of the frequency shift amount, for example, in a case of the FM modulation, a method of changing frequencies of the oscillators of the pseudo engine sound generator 21, varying frequency characteristics of a signal by a signal processing of a signal processor or a filter processing of a digital filter, or the like may be used. As an example of adjustment of a frequency shift of a modulation signal of the FM modulation, for example, the modulation parameter 17 for executing a processing such as changing the modulation width from 50 Hz to 100 Hz or changing the modulation period from 5 Hz to 25 Hz is set for a pseudo engine sound signal having a center frequency of 400 Hz. Accordingly, the pseudo engine sound can be modulated by adjusting a frequency variation width in accordance with an interaural phase difference.

The phase adjuster 12 executes a phase adjustment processing on modulated signals input from the signal modulator 11. The phase adjuster 12 adjusts a phase of a signal such that a phase difference between the left and right input signals becomes zero by using a phase adjustment parameter 16 calculated based on the interaural phase difference information 15.

The signal processor 10A adjusts localization of output signals by performing a modulation processing by the signal modulator 11 and a phase adjustment processing by the phase adjuster 12 on the input signals of the pseudo engine sound signals of the two left and right systems. The output signal of the signal processor 10A is a signal obtained by performing a signal processing including the modulation processing and the phase adjustment processing on the input signal of the pseudo engine sound in order to stabilize the localization. The modulation processing and the phase adjustment processing enable the occupant in the vehicle interior to recognize and listen to the pseudo engine sound stably localized in a predetermined direction. The signal processor 10A may be configured to omit a function of the phase adjuster 12 and execute only the modulation processing by the signal modulator 11 to improve stability of sound image localization of the output signals.

Next, a specific example of the modulation processing of the pseudo engine sound signals based on the interaural phase difference information in the present embodiment will be described.

FIG. 4 is a diagram illustrating a specific example of the modulation processing according to the embodiment. Sound characteristics in the vehicle interior are measured, so that interaural phase difference characteristics based on a positional relationship between the speakers and the occupant are acquired. For example, characteristics of an interaural phase difference 151 as shown in an upper left part of FIG. 4 are acquired. In binaural localization control, localization can be controlled by phase adjustment in a frequency band of 750 Hz or less of a sound signal. Here, by adjusting a phase of a pseudo engine sound signal and setting an absolute value of the interaural phase difference to zero, it is possible to localize the pseudo engine sound at center positions of both ears of the occupant. Therefore, in the binaural localization control, it is ideal that the absolute value of the interaural phase difference becomes zero. Here, the absolute value of the interaural phase difference of the signals being zero means that the left and right signals are in phase.

Here, the phase adjustment processing for eliminating the interaural phase difference will be described.

Figure 5A:
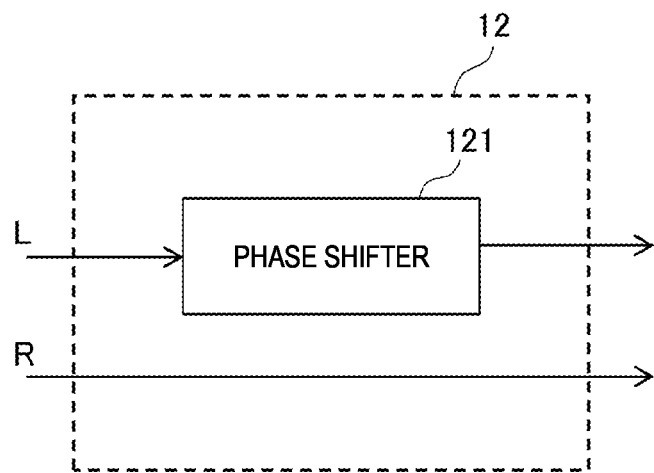
FIGS. 5A and 5B are diagrams showing an example of a configuration of a phase adjuster.
Figure 5B:
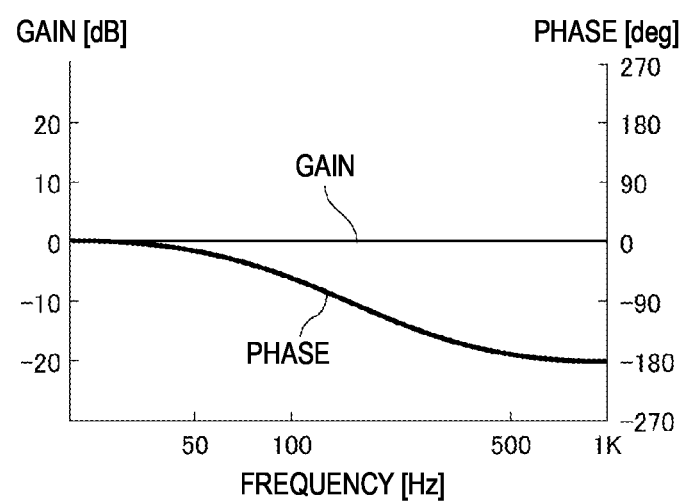

FIGS. 5A and 5B are diagrams showing an example of a configuration of the phase adjuster. FIG. 5A is a block diagram of the phase adjuster. FIG. 5B is a characteristic diagram showing frequency characteristics of a phase shifter. The phase adjuster 12 includes, for example, a phase shifter 121 in at least one signal path in signal paths of the plurality of systems. As shown in FIG. 5B, the phase shifter 121 has phase characteristics in which a gain is constant and a phase is delayed as a frequency increases. As the phase adjustment parameter 16 used in the phase adjuster 12, a parameter calculated in advance based on the interaural phase difference information 15 may be stored in a memory or may be acquired from an outside and used, or the phase adjustment parameter 16 may be calculated based on the interaural phase difference information 15 in the signal processor 10A. Such a phase adjuster 12 adjusts phases of the input signals to bring an absolute value of an interaural phase difference close to zero, so that a balance of a sound that reaches left and right ears of the occupant is adjusted.

At this time, depending on sound characteristics in the vehicle interior, the interaural phase difference cannot be eliminated by the phase adjustment, and the phase difference may remain even after the phase adjustment. In the signal processor 10A, a filter coefficient of a phase adjustment digital filter is calculated, and the interaural phase difference after the phase adjustment by the filter processing is calculated, so that frequency characteristics of phase adjustment adaptive performance in the target vehicle interior can be obtained.

In the description of the operation of the present embodiment, it is assumed that, for example, a frequency band in which an absolute value of the interaural phase difference 151 is not zero at a frequency of 750 Hz or less remains with respect to the interaural phase difference after the phase adjustment when performing the modulation processing shown in FIG. 4. At this time, depending on the frequency, a difference from an expected value of the phase adjustment occurs in the interaural phase difference. Here, the expected value of the phase adjustment of the interaural phase difference is zero. In this case, for example, the signal modulator 11 performs the modulation processing on an input signal 101 of a pseudo engine sound having frequency characteristics as shown in a lower left part of FIG. 4 by adjusting a frequency shift amount for each frequency band by using the modulation parameter 17 corresponding to magnitude of the absolute value of the interaural phase difference 151. The modulation parameter 17 may be set based on the interaural phase difference that remains after the phase adjustment processing by the phase adjuster 12. The modulation parameter 17 may be set in accordance with the interaural phase difference before the phase adjustment.

The modulation parameter 17 used in the signal modulator 11 may be calculated in advance based on the interaural phase difference information 15 and stored in the memory. Alternatively, a value calculated in advance based on the interaural phase difference information 15 may be acquired from an outside and used. The signal processor 10A may calculate the modulation parameter 17 based on the interaural phase difference information 15. In this way, the signal modulator 11 modulates the input signal by adjusting the frequency shift amount for each frequency band in accordance with a value of an interaural phase difference after the phase adjustment by the phase adjuster 12 or a value of an interaural phase difference before the phase adjustment. In the present embodiment, localization of a reproduced sound is improved by increasing or decreasing the frequency shift amount of the modulation processing of the input signal in accordance with the interaural phase difference.

Here, when the absolute value of the interaural phase difference is smaller than a predetermined value, the signal modulator 11 generates a modulation signal 102A in which a frequency shift amount is reduced as shown in an upper right part of FIG. 4. Further, when the absolute value of the interaural phase difference is larger than a predetermined value, the signal modulator 11 generates a modulation signal 102B in which a frequency shift amount is increased as shown in a lower right part of FIG. 4. When increasing the frequency shift amount of the modulation signal, a localization deviation of an audible pseudo engine sound due to the interaural phase difference can be reduced, a sense of localization can be improved, and localization of the pseudo engine sound can be stabilized. Further, when reducing the frequency shift amount of the modulation signal, it is possible to reduce a feeling of strangeness in a timbre caused by a modulation processing in a pseudo engine sound heard by the occupant.

When the signal modulator 11 performs a modulation processing, the modulation processing may be turned off depending on magnitude of the interaural phase difference after the phase adjustment processing by the phase adjuster 12. For example, when the absolute value of the interaural phase difference after the phase adjustment is equal to or larger than a predetermined threshold, the signal modulator 11 does not perform the modulation processing.

Accordingly, for example, in a state where adaptive performance for phase adjustment in the vehicle interior is not good, when the interaural phase difference is large enough to exceed a range of phase adjustment, the modulation function is stopped, so that a disturbance of a phase of a reproduced sound due to a modulation processing for localization control can be prevented, and the reproduced sound can be prevented from being localized in an unintended direction.

In this way, in the present embodiment, based on the interaural phase difference information determined by a position of the occupant in the vehicle interior, the input signal is modulated by adjusting a variation width in accordance with the interaural phase difference, and the frequency shift amount is adjusted for each frequency band. Further, for example, when a large interaural phase difference remains after the phase adjustment, the frequency shift amount of the modulation signal is controlled so as to increase the frequency shift amount. Accordingly, for example, localization of a reproduced pseudo engine sound can be stabilized, and direction estimation of a sound source can be prevented from becoming unstable. In this case, even in an environment of sound characteristics in which the interaural phase difference does not become zero by the phase adjustment, the localization deviation of the audible pseudo engine sound is reduced by increasing the frequency shift amount. Accordingly, since a sense of localization of the input signal is improved, for example, the sound image localization of the pseudo engine sound can be stabilized.

Second Embodiment

Figure 6:
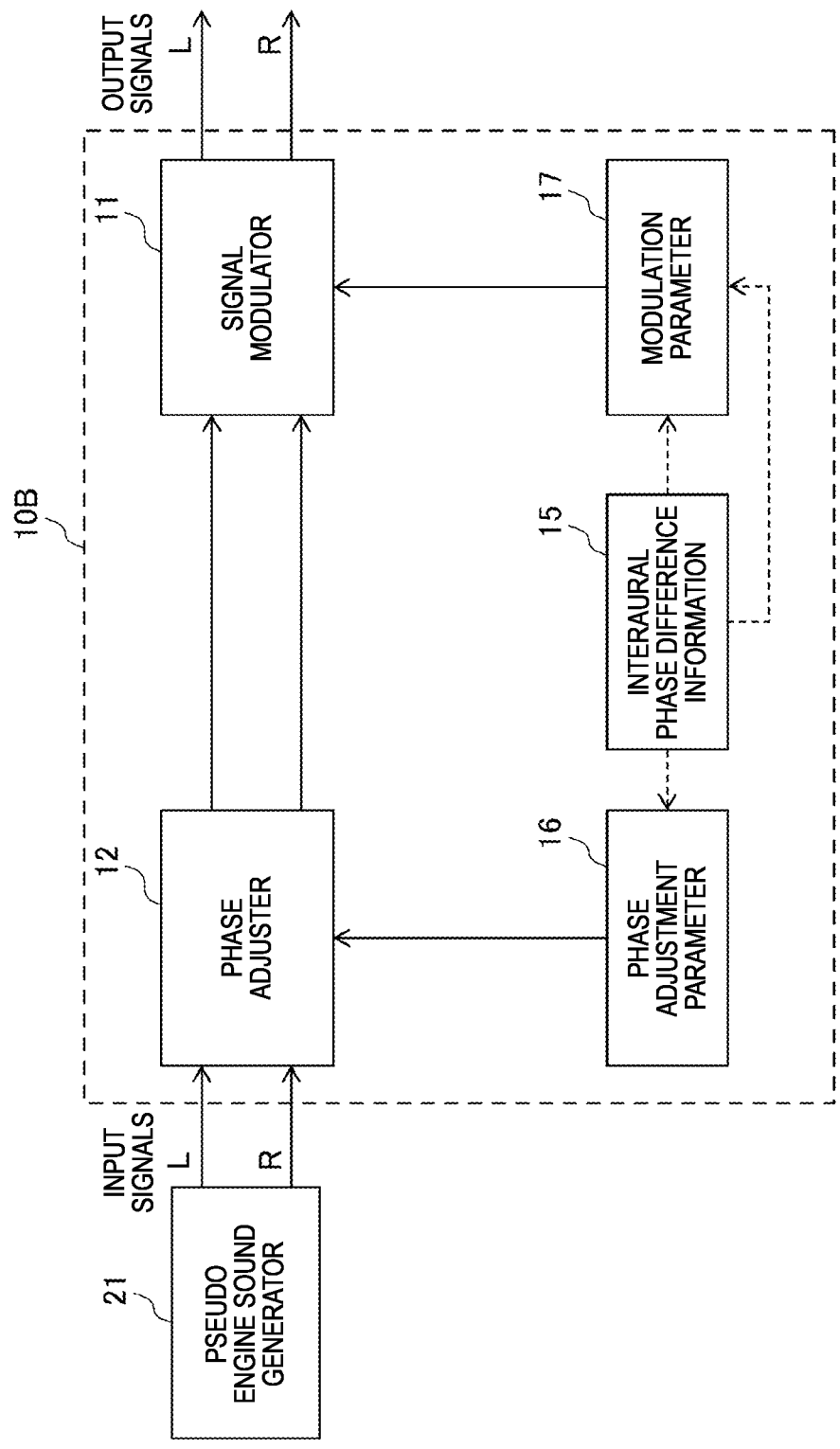
FIG. 6 is a block diagram showing an example of a configuration of a signal processing device according to a second embodiment.

FIG. 6 is a block diagram showing an example of a configuration of a signal processing device according to a second embodiment. The second embodiment is an example in which an order of the modulation processing and the phase adjustment processing in the first embodiment is changed, and input signals are modulated based on the interaural phase difference information. Hereinafter, parts different from those of the first embodiment will be mainly described, and description of the same configurations and processings as those of the first embodiment will be omitted.

A signal processor 10B according to the second embodiment includes the phase adjuster 12 and the signal modulator 11. In the signal processor 10B, the signal modulator 11 is provided after the phase adjuster 12. The phase adjuster 12 performs, a phase adjustment processing for reducing an interaural phase difference by using the phase adjustment parameter 16, on the input signals of pseudo engine sound signals of two left and right systems input from the pseudo engine sound generator 21. The phase adjustment parameter 16 is calculated based on the interaural phase difference information 15. Then, the signal modulator 11 uses the modulation parameter 17 to perform a modulation processing in which a frequency shift is adjusted in accordance with an interaural phase difference that remains after the phase adjustment. The modulation parameter 17 is calculated based on the interaural phase difference information 15.

The interaural phase difference is determined by the positions of the speakers and the position of the occupant in the vehicle interior, and is invariable without being influenced by a signal processing such as phase adjustment and modulation. Therefore, even in a configuration in which a modulation processing is executed by the signal modulator 11 after a phase adjustment processing is performed by the phase adjuster 12 as in the second embodiment, it is possible to obtain the same effect as that of the first embodiment. In the present embodiment, a frequency shift amount is adjusted in accordance with the interaural phase difference that remains after the phase adjustment, and the frequency shift amount is increased when an absolute value of the interaural phase difference is large, so that localization of a reproduced pseudo engine sound can be stabilized.

Third Embodiment

Figure 7:
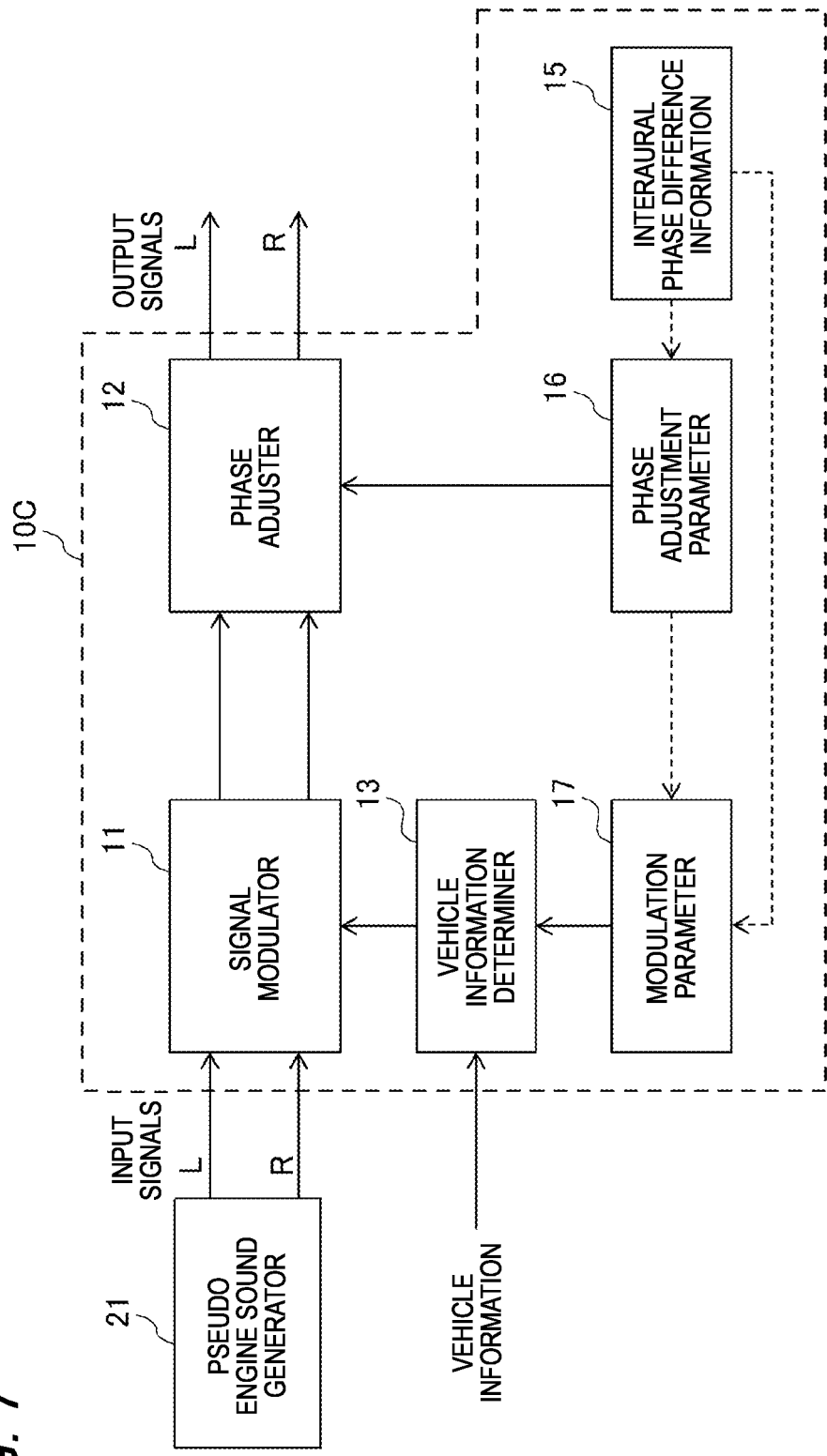
FIG. 7 is a block diagram showing an example of a configuration of a signal processing device according to a third embodiment.

FIG. 7 is a block diagram showing an example of a configuration of a signal processing device according to a third embodiment. The third embodiment is a configuration example of the signal processing device that modulates input signals based on interaural phase difference information and vehicle information. Hereinafter, parts different from those of the first embodiment will be mainly described, and description of the same configurations and processings as those of the first embodiment will be omitted.

The signal processor 10B according to the third embodiment includes the signal modulator 11, the phase adjuster 12, and a vehicle information determiner 13. The vehicle information is input to the vehicle information determiner 13. The vehicle information determiner 13 adjusts the modulation parameter 17 supplied to the signal modulator 11 based on the input vehicle information. For example, the vehicle information determiner 13 changes the modulation parameter 17 used in the signal modulator 11 in accordance with magnitude of a change amount of the vehicle information. Specifically, the vehicle information determiner 13 performs control such as decreasing the modulation parameter 17 when the change amount of the vehicle information is smaller than a predetermined value, or changing the modulation parameter 17 so as to stop modulation depending on a value of the vehicle information.

Here, a specific example of control of the modulation parameter 17 based on the vehicle information in the vehicle information determiner 13 will be shown.

Figure 8A:
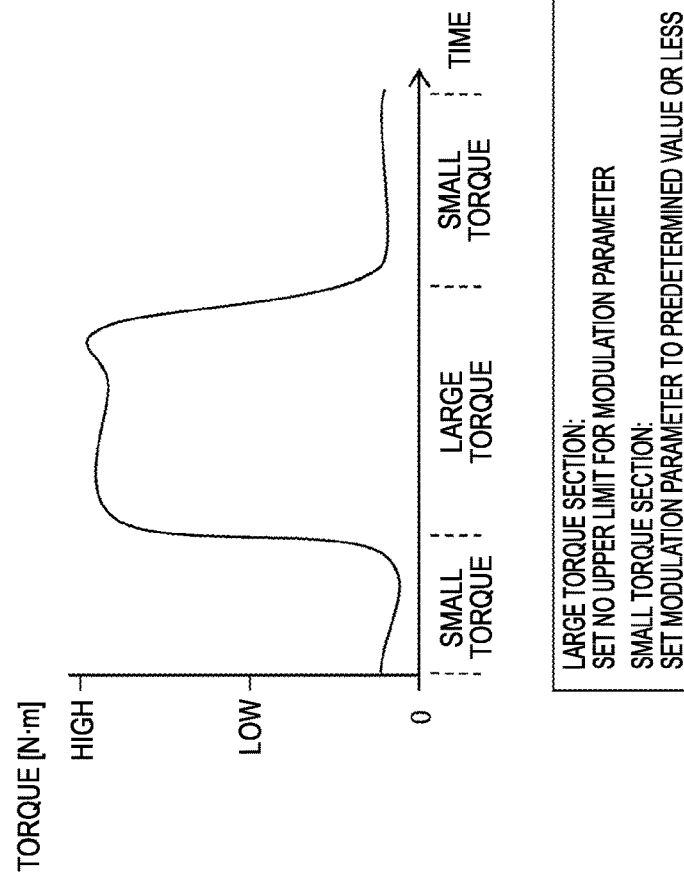
FIGS. 8A and 8B are diagrams illustrating an example of a modulation processing based on vehicle information.
Figure 8B:
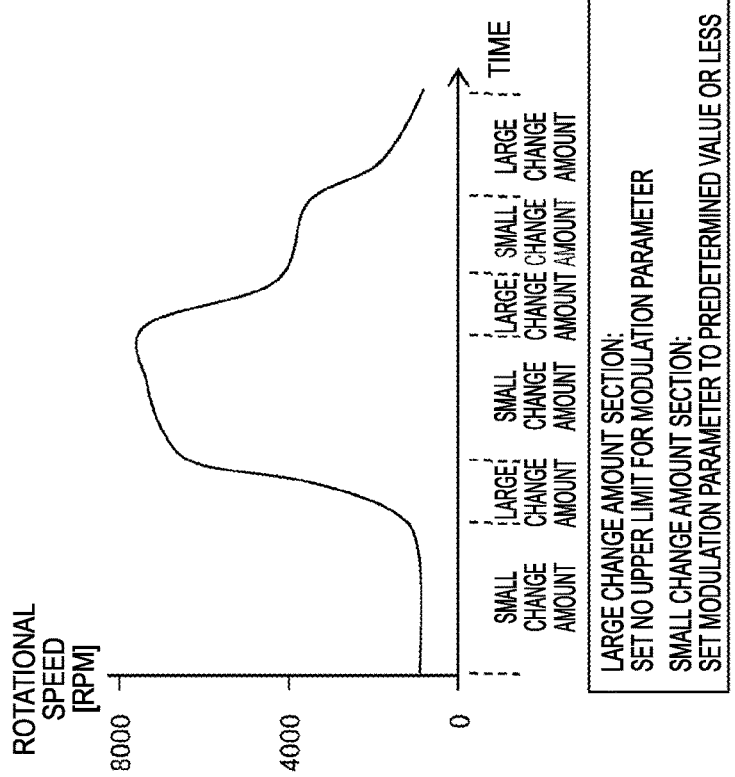

FIGS. 8A and 8B are diagrams illustrating an example of a modulation processing based on the vehicle information. FIG. 8A is a diagram showing passage of time of a rotational speed of an engine and magnitude of a change amount thereof. FIG. 8B is a diagram showing passage of time of a torque and magnitude of a change amount thereof.

FIG. 8A shows an example of a change in the rotational speed of the engine over time. In a section where the change amount of the rotational speed of the engine is large, even when a pseudo engine sound changes, it is difficult for the occupant to recognize the change. Therefore, the modulation parameter 17 corresponding to an interaural phase difference is supplied to the signal modulator 11 as it is without providing an upper limit for the modulation parameter. On the other hand, in a section where the change amount of the rotational speed is small, it is easy for the occupant to recognize a change in the pseudo engine sound. Therefore, the upper limit is provided for the modulation parameter, and the modulation parameter 17 is adjusted within a range of a predetermined value or less and is supplied to the signal modulator 11.

FIG. 8B shows an example of a change in the torque of the engine over time. In a section where the torque of the engine is large, even when a pseudo engine sound changes, it is difficult for the occupant to recognize the change. Therefore, the modulation parameter 17 corresponding to an interaural phase difference is supplied to the signal modulator 11 as it is without providing an upper limit for the modulation parameter. On the other hand, in a section where the torque is small, it is easy for the occupant to recognize the change in the pseudo engine sound. Therefore, the upper limit is provided for the modulation parameter, and the modulation parameter 17 is adjusted within a range of a predetermined value or less and is supplied to the signal modulator 11.

As another example of the modulation parameter control based on the vehicle information, for example, the modulation parameter may be reduced in a constant speed state where a change amount of a vehicle speed is small. A modulation processing of the signal modulator 11 may be turned off under a predetermined condition, for example, when a steady state where the rotational speed of the engine is constant continues for a predetermined time or more.

In the present embodiment, the modulation parameter is adjusted based on the vehicle information, and the pseudo engine sound is modulated, so that it is possible to reduce a feeling of strangeness in timbre caused by the modulation processing in a pseudo engine sound heard by the occupant, and it is possible to perform appropriate localization control of the pseudo engine sound in accordance with a traveling state of the vehicle. Therefore, it is possible to stabilize the localization of the pseudo engine sound by the appropriate modulation processing, and it is possible to improve a sense of realism during traveling by the pseudo engine sound.

As described above, according to the present embodiment, it is possible to improve stability of the localization of the reproduced sound by modulating the sound signal based on the interaural phase difference determined by the sound characteristics in the vehicle interior and the positional relationship of the occupant. At this time, by increasing or decreasing the modulation parameter such as the frequency shift amount in accordance with the magnitude of the interaural phase difference, the sound image localization can be stabilized, and accuracy of the direction estimation of the sound source can be improved.

As described above, the signal processing device according to the present embodiment is a signal processing device to which a sound signal is input and that performs a signal processing on the sound signal, and includes the signal modulator 11 that performs a modulation processing of modulating the sound signal by using the modulation parameter 17 based on an interaural phase difference at a listening position of the sound signal. The sound signal is, for example, a pseudo engine sound that can be localized in a predetermined direction. For example, the interaural phase difference information 15 is used as the interaural phase difference. In the signal modulator 11, the modulation parameter of the sound signal is increased or decreased in accordance with the interaural phase difference, and the modulation processing is performed. Accordingly, it is possible to improve a sense of localization of a reproduced sound of the sound signal and stabilize localization of a reproduced pseudo engine sound or the like.

In the signal processing device, when an absolute value of the interaural phase difference is larger than a predetermined value, the signal modulator 11 increases a frequency shift amount serving as the modulation parameter 17 in the modulation processing. Accordingly, a localization deviation of the audible pseudo engine sound due to the interaural phase difference can be reduced, a sense of localization can be improved, and localization of the pseudo engine sound or the like can be stabilized.

In the signal processing device, when the absolute value of the interaural phase difference is smaller than a predetermined value, the signal modulator 11 reduces the frequency shift amount serving as the modulation parameter 17 in the modulation processing. Accordingly, it is possible to reduce the feeling of strangeness caused by the modulation processing in the pseudo engine sound or the like heard by the occupant.

The signal processing device includes the phase adjuster 12 that performs phase adjustment on a sound signal that has not been subjected to the modulation processing or a sound signal that has been subjected to the modulation processing. In the phase adjuster 12, a phase of the sound signal is adjusted, and the absolute value of the interaural phase difference is brought close to zero, so that a balance of a sound that reaches left and right ears of the occupant is adjusted. Accordingly, the interaural phase difference can be reduced, and the localization of the reproduced pseudo engine sound or the like can be stabilized.

In the signal processing device, the signal modulator 11 performs the modulation processing by using the modulation parameter 17 based on the interaural phase difference after the phase adjustment. When the interaural phase difference remains after the phase adjustment by the phase adjuster 12, the signal modulator 11 performs a modulation processing in which a frequency shift amount is adjusted for each frequency band by using a modulation parameter corresponding to an absolute value of the remaining interaural phase difference. Accordingly, even in an environment where the interaural phase difference does not become zero by the phase adjustment, it is possible to improve a sense of localization of the reproduced sound of the sound signal and stabilize the localization of the reproduced pseudo engine sound or the like.

In the signal processing device, the signal modulator 11 does not perform the modulation processing when an absolute value of the interaural phase difference after the phase adjustment is equal to or larger than a predetermined threshold. After the phase adjustment by the phase adjuster 12, when the interaural phase difference is equal to or larger than a predetermined threshold, the modulation processing by the signal modulator 11 is stopped. Accordingly, when the interaural phase difference is large enough to exceed a range of the phase adjustment, it is possible to prevent a disturbance of a phase of a reproduced sound due to the localization control.

The sound signal is the pseudo engine sound. The signal processing device includes the vehicle information determiner 13 to which vehicle information on generation of the pseudo engine sound is input and that adjusts the modulation parameter based on the vehicle information. The signal modulator 11 performs the modulation processing by using the modulation parameter 17 based on the vehicle information. The signal modulator 11 adjusts the modulation parameter 17 based on the vehicle information and modulates the pseudo engine sound. For example, when a change amount of a rotational speed of an engine, a torque, and the like are small and close to a steady state, the modulation parameter is reduced to reduce a degree of the modulation. Accordingly, it is possible to reduce the feeling of strangeness caused by the modulation processing in the pseudo engine sound heard by the occupant, and it is possible to perform appropriate localization control of the pseudo engine sound in accordance with a traveling state of the vehicle.

The sound-reproduction system according to the present embodiment is a sound-reproduction system that reproduces a sound signal, and includes the sound generator 20 that generates a sound signal, the signal processor 10 that performs a signal processing on the generated sound signal, and the output device 30 that outputs a sound signal that has been subjected to the signal processing. The signal processor 10 includes the signal modulator 11 that modulates a sound signal by using the modulation parameter 17 based on an interaural phase difference at a listening position of the output sound signal. In the signal modulator 11, the modulation parameter of the sound signal is increased or decreased in accordance with the interaural phase difference, and the modulation processing is performed, so that it is possible to improve a sense of localization of a reproduced sound of the sound signal and stabilize localization of a reproduced pseudo engine sound or the like.

The sound reproduction method according to the present embodiment is a sound reproduction method for reproducing a sound signal, in which by the signal processor 10 to which a sound signal is input and that performs a signal processing on the sound signal, performing a modulation processing of modulating the sound signal by using the modulation parameter 17 based on an interaural phase difference at a listening position of the sound signal, and outputting a sound signal that has been subjected to a signal processing including the modulation processing from the output device 30. The modulation parameter of the sound signal is increased or decreased in accordance with the interaural phase difference and the modulation processing is performed, so that it is possible to improve a sense of localization of a reproduced sound of the sound signal and stabilize localization of a reproduced pseudo engine sound or the like.

Although various embodiments are described above with reference to the drawings, it is needless to say that the present disclosure is not limited to such examples. It will be apparent to those skilled in the art that various alterations, modifications, substitutions, additions, deletions, and equivalents can be conceived within the scope of the claims, and it should be understood that such changes also belong to the technical scope of the present disclosure. Components in the above-described embodiment may be optionally combined within a range not departing from the spirit of the invention.

The present application is based on Japanese Patent Application (Japanese Patent Application No. 2019-059938) filed on Mar. 27, 2019, and the contents of which are incorporated herein by reference.

The present disclosure is useful as a signal processing device, a sound-reproduction system, and a sound reproduction method that can further improve adjustment of sound image localization of an output signal.

The invention claimed is:

1. A signal processing device comprising:
a processor; and
a memory including instructions that, when executed by the processor, cause the signal processing device to perform operations, the operations comprising:
performing a modulation processing of modulating a sound signal by using a modulation parameter based on an interaural phase difference at a listening position of the sound signal,
wherein the modulation parameter comprises a frequency shift amount, and
wherein the operations further comprise increasing the frequency shift amount in the modulation processing in a case in which an absolute value of the interaural phase difference is larger than a predetermined value.

2. The signal processing device according to claim 1, wherein the operations further comprise reducing the frequency shift amount in the modulation processing in a case in which the absolute value of the interaural phase difference is smaller than the predetermined value.

3. The signal processing device according to claim 1, wherein the frequency shift amount comprises a modulation width representing a frequency width to be changed.

4. The signal processing device according to claim 1, wherein the frequency shift amount comprises a modulation period representing a period to be changed.

5. The signal processing device according to claim 1, wherein the frequency shift amount comprises a modulation amplitude representing a signal level width to be changed.

6. The signal processing device according to claim 1, wherein the operations further comprise a phase adjustment on a sound signal that has not been subjected to the modulation processing or the sound signal that has been subjected to the modulation processing.

7. The signal processing device according to claim 6, wherein the modulation parameter comprises a parameter based on the interaural phase difference after the phase adjustment.

8. The signal processing device according to claim 6, wherein the operations further comprise turning off the modulation processing in a case in which the absolute value of the interaural phase difference after the phase adjustment is equal to or larger than a predetermined threshold.

9. The signal processing device according to claim 1, wherein the sound signal is a pseudo engine sound, and
wherein the operations further comprise adjusting the modulation parameter based on vehicle information on generation of the pseudo engine sound.

10. The signal processing device according to claim 9, wherein the vehicle information comprises a change amount of a rotational speed of an engine, and
wherein the operations further comprise:
providing no upper limit for the modulation parameter in a case in which the change amount is larger than a threshold; and
providing the upper limit for the modulation parameter in a case in which the change amount is equal to or smaller than the threshold.

11. The signal processing device according to claim 9, wherein the vehicle information comprises a magnitude of a torque of an engine, and
wherein the operations further comprise:
providing no upper limit for the modulation parameter in a case in which the magnitude is larger than a threshold; and
providing the upper limit for the modulation parameter in a case in which the magnitude is equal to or smaller than the threshold.

12. The signal processing device according to claim 9, wherein the vehicle information comprises a change amount of a vehicle speed, and
wherein the operations further comprise reducing the modulation parameter in a case in which the change amount is smaller than a second predetermined value.

13. The signal processing device according to claim 9, wherein the vehicle information comprises a change amount of a rotational speed of an engine, and
wherein the operations further comprise turning off the modulation processing in a case in which the rotational speed is constant for a predetermined time.

14. The signal processing device according to claim 1, wherein the modulation processing is performed on a frequency band in accordance with characteristics of the interaural phase difference.

15. The signal processing device according to claim 1, further comprising:
a storage,
wherein the operations further comprise reading out the modulation parameter from the storage.

16. A sound reproduction method for reproducing a sound signal, the sound reproduction method comprising:
performing a signal processing, the signal processing comprising a modulation processing of modulating the sound signal by using a modulation parameter based on an interaural phase difference at a listening position of the sound signal; and
outputting the sound signal subjected to the signal processing via an output device,
wherein the modulation parameter comprises a frequency shift amount, and
the signal processing further comprises increasing the frequency shift amount in the modulation processing in a case in which an absolute value of the interaural phase difference is larger than a predetermined value.

17. A signal processing device comprising:
a processor; and
a memory including instructions that, when executed by the processor, cause the signal processing device to perform operations, the operations comprising:
    performing a modulation processing of modulating a sound signal by using a modulation parameter based on an interaural phase difference at a listening position of the sound signal,
wherein the modulation parameter comprises a frequency shift amount, and
the operations further comprise reducing the frequency shift amount in the modulation processing in a case in which an absolute value of the interaural phase difference is smaller than a predetermined value.

* * * * *